US006400829B1

(12) United States Patent
Petkovsek

(10) Patent No.: US 6,400,829 B1
(45) Date of Patent: Jun. 4, 2002

(54) SYSTEM AND METHOD FOR FULLY AUTOMATING IMAGING OF SPECIAL SERVICE FORMS AND AFFIXING SAME

(76) Inventor: Glenn Petkovsek, 20 Tortoise Park Cove, Little Rock, AR (US) 72211

(*) Notice: Subject to any disclaimer, the term of this patent is extended or adjusted under 35 U.S.C. 154(b) by 977 days.

(21) Appl. No.: 08/579,242

(22) Filed: Dec. 28, 1995

(51) Int. Cl.[7] .................................................. G06K 9/00

(52) U.S. Cl. ....................... 382/101; 382/317; 235/375; 235/432

(58) Field of Search ................................ 382/101, 317; 235/432, 375; 364/478.16, 478.15, 478.14, 478.18, 478.03

(56) References Cited

U.S. PATENT DOCUMENTS 3,968,350 A * 7/1976 Watson ................ 235/61.12 N
4,743,747 A * 5/1988 Fougere et al. ............. 235/494
5,199,084 A * 3/1993 Kishi et al. ................. 382/317
5,317,654 A * 5/1994 Perry et al. ................. 382/101

* cited by examiner

*Primary Examiner*—Matthew C. Bella
(74) *Attorney, Agent, or Firm*—Patents + TMS, P.C.

(57) ABSTRACT

A system for automatically imaging special service forms and affixing same to an envelope is provided. The system has a mailpiece handler for accepting mailpieces having a machine readable code. The system also has a data storage unit for storing addressee and/or sender data related to the mailpieces. A code reader constructed and arranged to read the machine-readable code on the mailpieces is provided. An imaging unit is provided for imaging data onto special service forms wherein the data is obtained from the data storage unit. Further, an assembly unit assembles the special service forms to the mailpieces. Further, a method of fully automating imaging of special service forms and affixing same to an envelope is also provided. The method has the steps of inserting a mailpiece having a code into a mailpiece handler, reading the code from the mailpiece, storing addressee and/or sender data, processing the code from the mailpiece to select a corresponding stored addressee and/or sender data, imaging the corresponding addressee and/or sender data onto a form, and assembling the form with the mailpiece.

19 Claims, 3 Drawing Sheets

SYSTEM AND METHOD FOR FULLY AUTOMATING IMAGING OF SPECIAL SERVICE FORMS AND AFFIXING SAME

BACKGROUND OF THE INVENTION

The present invention generally relates to a system and method for processing special service mail forms and envelopes. More specifically, the present invention relates to a system and method for fully automating imaging of special service forms and affixing the forms to a mailpiece, such as an envelope, for example.

It is, of course, known to send mail requiring special services. These special services include certified mail, registered mail, insured mail, return-receipt requested mail, etc. A disadvantage of such special service mailings is that they require a rather extensive amount of manual preparation and labor prior to mailing. For example, to send a certified letter with return-receipt requested, a PS-form 3811 and a PS-form 3800 must be affixed to the envelope. This usually requires applying an adhesive to the envelope, the form or both. Also peel and stick materials can be used to affix the form to the envelope. In addition, the PS-form 3811 must be filled out by the sender prior to affixing the form to the envelope.

Despite these shortcomings, many companies and individuals extensively use certified mail and other special service types of mailing. However, when the above-mentioned difficulties in processing certified mail and preparing it for mailing are multiplied by a large number of mailpieces, the time and labor intensive nature of preparing the special service mailings becomes quite costly and results in an inefficient use of employee time.

A need, therefore, has arisen for a system and a method for fully automating imaging of special service forms and affixing the forms to a corresponding mailpiece, such as an envelope, for example.

SUMMARY OF THE INVENTION

The present invention provides a system and a method for fully automating imaging of special service forms and affixing the imaged forms to an envelope.

To this end, in an embodiment, a method is provided for automatically processing special service mailpieces. The method has the steps of: inserting a mailpiece into a mailpiece handler and scanning the mailpiece to read information located thereon. Another step involves storing data related to the mailpiece. Further, the method includes processing the scanned information in order to select corresponding imaging data from the stored data related to the mailpiece. The method also includes imaging the imaging data onto the form and assembling the form after it has been imaged with the mailpiece.

In another embodiment of the present invention a system is provided for automatically imaging special service forms and affixing the forms to a corresponding mailpiece. The system includes means for accepting the corresponding mailpieces having machine readable code; means for storing data related to the corresponding mailpieces; a code reader constructed and arranged to read the machine-readable code on the corresponding mailpieces; means for imaging data onto special service forms wherein the data is obtained from the means for storing data; and means for assembling the special service form to the corresponding mailpieces.

In an embodiment, the method further comprises inserting a plurality of mailpieces into the mailpiece handler.

In an embodiment, the method further comprises scanning the mailpiece to read a bar code located thereon.

In an embodiment, the method further comprises storing addressee and/or sender data related to the mailpiece.

In an embodiment, the method further comprises storing data from a PS 3877 form.

In an embodiment, the method further comprises imaging PS 3849 forms.

In an embodiment, the method further comprises imaging the imaging data onto a PS 3811 form and a PS 3800 form.

In an embodiment, the method further comprises verifying the accuracy of the scanning step, the imaging step and the assembling step.

In an embodiment, the method further comprises generating a processing report of mailpieces assembled.

In another embodiment to the present invention, a method of fully automating imaging of special service forms and affixing the same to a mailpiece is provided. The method has the steps of: inserting a mailpiece having a code into a mailpiece handler; reading the code from the mailpiece; storing addressee and/or sender data; processing the code from the mailpiece to select a corresponding stored addressee and/or sender data; imaging the corresponding addressee and/or sender data onto a form; and assembling the imaged form with the corresponding one mailpiece.

In an embodiment, the method further comprises imaging alternate forms using the data obtained during the step of reading the code from the corresponding mailpiece.

In an embodiment, the method further comprises verifying the accuracy of the reading step, the imaging step and the assembling step.

In an embodiment, the method further comprises storing data for a PS 3877 form.

In an embodiment, the method further comprises imaging the corresponding addressee and/or sender data onto a PS 3811 form and a PS 3800 form.

In an embodiment, the system of the present invention provides means for accepting a plurality of mailpieces having a machine readable code; means for storing data related to the plurality of mailpieces; a code reader constructed and arranged to read the machine-readable code on the plurality of mailpieces; means for imaging data onto special service forms wherein the data is obtained from the means for storing data; and means for assembling the special service forms to the plurality of mailpieces.

In an embodiment, the system of the present invention provides means for verifying the imaging data on the special service forms.

In an embodiment, the system further comprises a bar code reader constructed and arranged to read the machine-readable code on the plurality of mailpieces.

In an embodiment, the system further comprises a computer controller.

In an embodiment, the system further comprises a label dispenser constructed and arranged to feed the special service forms to the means for imaging.

In an embodiment, the system further comprises at least one further code reader constructed and arranged to examine the assembled special service forms with the plurality of mailpieces.

It is, therefore, an advantage of the present invention to provide a system and a method for fully automating imaging of special service forms and affixing the imaged forms to an envelope.

Another advantage of the present invention is to provide a system and a method that is fully automated.

Yet another advantage of the present invention is to provide a system and a method for verifying the accuracy of reading, imaging and assembling the special service mailpiece.

Yet another advantage of the present invention is to provide a system and a method for generating processing reports for a plurality of mailpieces.

Moreover, an advantage of the present invention is to provide a system and a method for generating delivery notice forms.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides a system for fully automating imaging of special service forms and affixing same to envelopes. Further, the present invention provides a method for fully automating imaging of special service forms and affixing same to envelopes.

Figure 1:
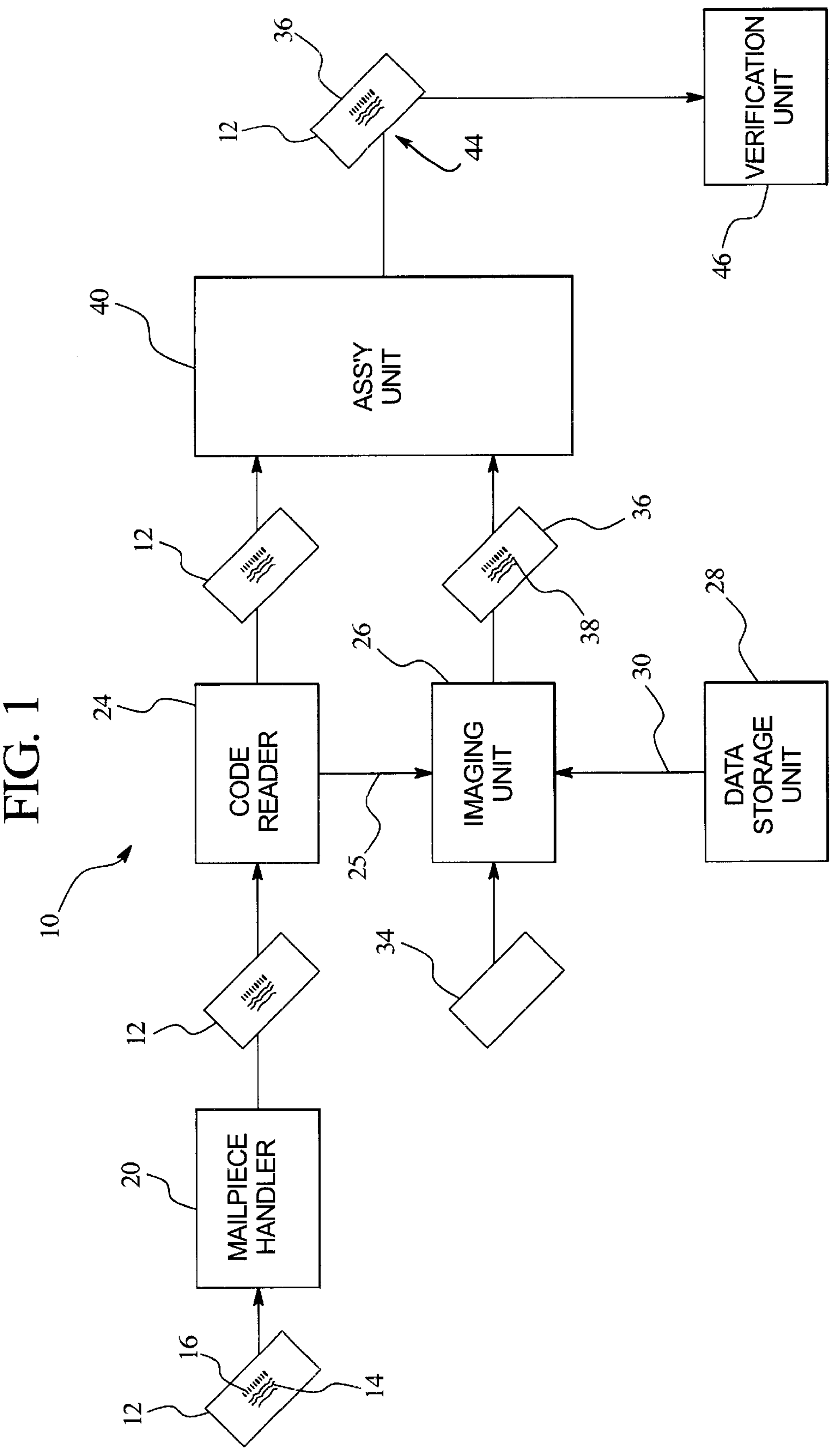
FIG. 1 illustrates a schematic block diagram of an embodiment of the system of the present invention.

Referring now to the drawings, wherein like numerals refer to like parts, FIG. 1 generally illustrates a system 10 for fully automating the imaging of special service mailing forms and affixing same to mailpieces or envelopes. In the embodiment illustrated, an envelope 12 is provided with an address section 14 and a bar code 16. The bar code 16 provides additional information about the mailpiece. Those skilled in the art will recognize that bar coding is an illustrative example, and any type of machine-readable code may be used.

The address section 14 and the bar code 16 may be appropriately printed on a letter (not shown) which is inserted within the envelope 12 to show through a window provided in a number 10 standard envelope, for example. Alternatively, the address section 14 and the bar code 16 may be printed on a separate label (not shown) which is affixed to a mailpiece, such as a post card, or to the exterior of the envelope 12. Also, the address section 14 and the bar code 16 can be directly printed on the envelope 12. Of course, one skilled in the art will recognize that the address section 14 and the bar code 16 can be provided on the mailpiece in any manner desired.

In the embodiment shown, the envelope 12 is placed into a mailpiece handler 20 of the system 10. FIG. 1 shows only one envelope 12, however, a plurality of envelopes 12 can be inserted into the mailpiece handler 20, such as a continuous stream of envelopes. The mailpiece handler 20 is a feed and transport device for handling the envelopes 12. The mailpiece handler 20 may be of a standard design used for handling mailpieces in general.

The envelope 12 is transported by a code reader 24 which scans the bar code 16 on the envelope 12. The code reader 24 reads the bar code 16 and provides a data signal on a data communication line 25 to an imaging unit 26. In this embodiment, the code reader 24 is a bar code reader. However, any appropriate reader capable of performing character recognition may be used.

The imaging unit 26 processes the data signal from the code reader 24 and correlates it with addressee and/or sender data that is stored in a data storage unit 28. The addressee and/or sender data that is stored in the data storage unit 28 can be from a PS-form 3877 in order to standardize the data format. However, one skilled in the art will recognize that the data need not be from a PS-form 3877. Any type of data arrangement is capable of being stored in the data storage unit 28. Also, the data storage unit 28 has a data communication line 30 connected to the imaging unit 26.

Thus, the imaging unit 26 is capable of processing the data signal obtained from the code reader 24 by reading the bar code 16 on the envelope 12. The data signal is then used to select the proper corresponding addressee and/or sender data from the stored data in the data storage unit 28. Then, the imaging unit 26 automatically images the corresponding addressee and/or sender data onto a special service mailing form 34. The special service mailing form may be a PS-form 3811, which is a Postal Service domestic return-receipt form. Of course, one skilled in the art will recognize that any desired form or label may be imaged using the system 10. Also, the imaging unit 26 may provide imaging on either or both sides of the form 34.

After the special service form 34 has been imaged with the addressee and/or sender data, an imaged special service form 36 having an image section 38 is provided to an assembly unit 40. In a coordinated, parallel operation of the system 10, the envelope 12 corresponding to the imaged form 36 is also provided to the assembly unit 40.

The imaged special service form 36 is assembled to the corresponding envelope 12 in preparation for mailing. The output of the assembly unit 40 is a completed special service mailpiece 44 consisting of the envelope 12 and the corresponding imaged special service form 36 affixed thereto. The imaged special service form 36 may be adhered to the envelope 12 or otherwise attached thereto. In FIG. 1, the imaged form 36 is assembled to the backside of the envelope 12. Commonly, this may be done with adhesive strips (not shown) initially provided on the special service form 34.

An additional feature of an embodiment of the present invention shown in FIG. 1 is a verification unit 46. The verification unit 46 examines the completed mailpiece 44. The verification unit 46 may comprise additional code readers for analyzing the completed mailpiece 44. For example, the address section 14, the bar code 16 and the imaged special service form 36 are all examined. As a result of this examination, the verification unit 46 is able to verify that the imaged form 36 was properly imaged and assembled to the envelope 12. Cross-checking of the addressee and/or sender data 38 on the imaged form 36 can also be checked with respect to the address section 14 and the bar code 16 of the envelope 12.

Figure 2:
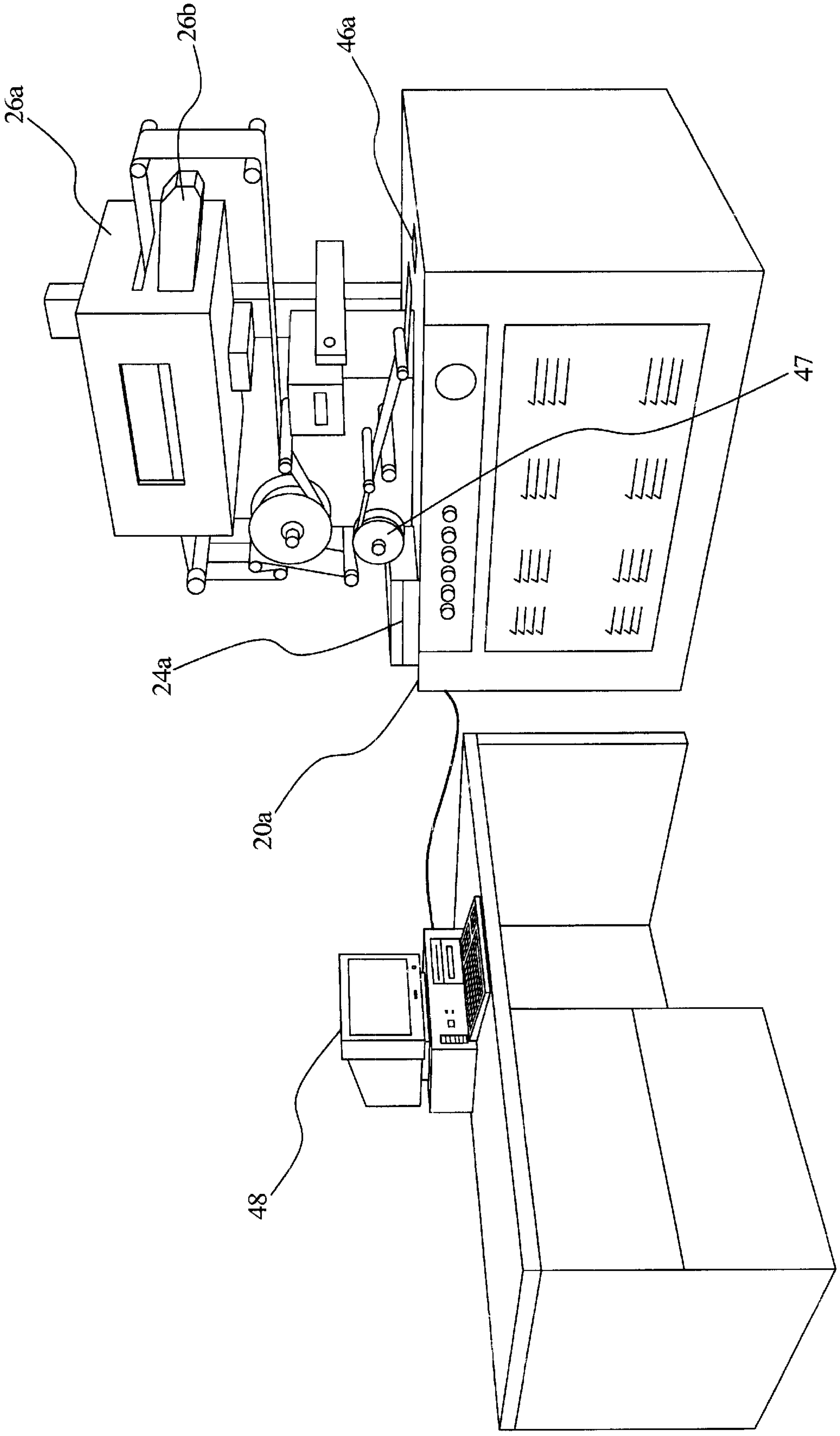
FIG. 2 illustrates an embodiment of the system of the present invention.

FIG. 2 illustrates an embodiment of the system 10 of the present invention wherein like numbers represent like parts. The system 10 is shown having the mailpiece handler 20 embodied as an envelope feeder 20*a*. The code reader 24 is shown as a bar code reader 24*a*. The imaging unit 26 is shown as a front printer 26*a* and a back printer 26*b*. The forms 34 are provided for imaging by a label dispenser 47. The verification unit 46 is shown as a further bar code reader 46*a*. In addition, the system 10 has a computer controller 48 connected thereto.

Figure 3:
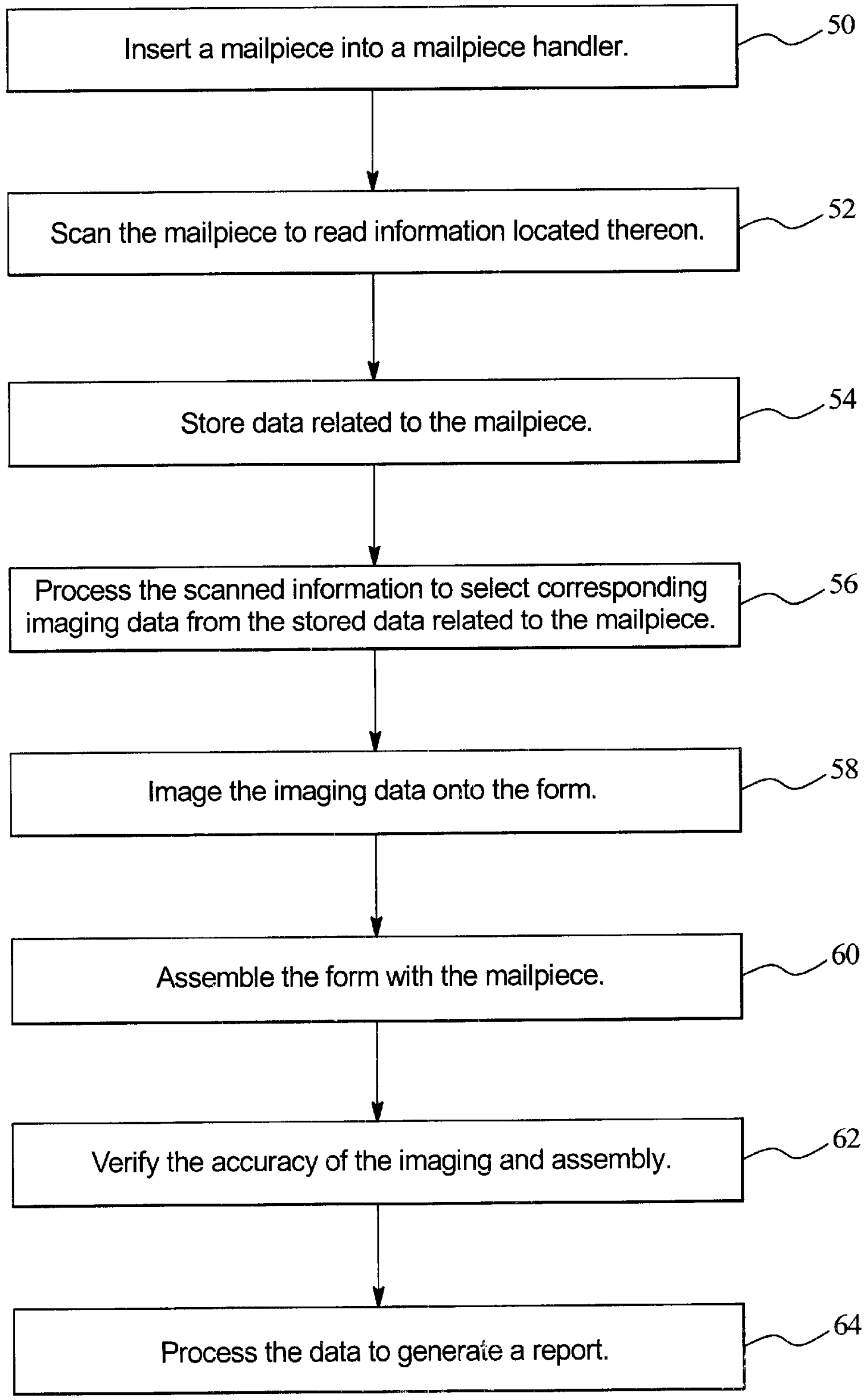
FIG. 3 illustrates a flowchart of an embodiment of the method of the present invention.

Referring now to a detailed description of the method of the present invention as illustrated in an embodiment shown in the flowchart of FIG. 3, the method provides fully automated imaging of special service forms and affixing the forms to a mailpiece, such as an envelope, as discussed above. The method may be performed using the system 10 similar to that described above.

The method steps of the embodiment of the invention illustrated in FIG. 3 include step 50 of inserting at least one mailpiece having a code into a mailpiece handler. Step 52 provides for reading the code from the mailpiece to provide a data signal to an imaging unit. Step 54 provides for storing addressee and/or sender data in a data storage unit. Step 56 provides processing the code from the mailpiece to select a corresponding stored address and/or sender data. Further, step 58 provides the imaging of the corresponding address and/or sender data onto a special service form, such as a certified mail form. Step 60 provides the step of assembling the form with the mailpiece.

Additional method steps include various related features for the user's convenience. For example, step 62 of the method of the present invention provides for verifying the accuracy of the reading step 52, the imaging step 58 and the assembling step 60 of the method. The data on the form and the envelope is thereby also verified. In addition, step 64 provides for generating processing reports of the mailpieces automatically imaged by the method of the present invention. Further steps are possible for generating alternate forms, for example, a PS-3849 delivery notice form for all of the certified mailpieces handled during the method.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method of automating imaging of a form and assembling the form on a corresponding mailpiece wherein the form effects delivery of the mailpiece by a special service, the method comprising the steps of:

providing a mailpiece requiring delivery by a special service;

inserting the mailpiece into a mailpiece handler;

scanning the mailpiece to read information located thereon;

storing data related to the mailpiece;

processing the scanned information to select corresponding imaging data from the stored data related to the mailpiece;

providing a form required to deliver the mailpiece by the special service;

imaging the imaging data onto the form; and assembling the form with the mailpiece.

2. The method of claim 1 further comprising the step of:

inserting a plurality of mailpieces into the mailpiece handler.

3. The method of claim 1 further comprising the step of:

scanning the mailpiece to read a bar code located thereon.

4. The method of claim 1 further comprising the step of:

storing addressee and/or sender data related to the mailpiece.

5. The method of claim 1 further comprising the step of:

storing data from a PS-3877 form.

6. The method of claim 1 further comprising the step of:

imaging a PS-3849 form and a PS-3800 form and other forms.

7. The method of claim 1 further comprising the step of:

imaging the imaging data onto a PS-3811 form.

8. The method of claim 1 further comprising the step of:

verifying the accuracy of the scanning step, the imaging step and the assembling step.

9. A method of fully automating imaging of special service forms and affixing each form to an appropriate mailpiece to effect delivery of the mailpiece by a special service, the method comprising the steps of:

providing a mailpiece requiring delivery by a special service;

inserting the mailpiece having a code into a mailpiece handler;

reading the code from the mailpiece;

storing addressee and/or sender data;

processing the code from the mailpiece to select a corresponding stored addressee and/or sender data;

providing a form required to deliver the mailpiece by the special service;

imaging the corresponding addressee and/or sender data onto the form; and assembling the imaged form with the corresponding mailpiece.

10. The method of claim 9 further comprising the step of:

imaging alternate forms.

11. The method of claim 9 further comprising the step of:

verifying the accuracy of the reading step, the imaging step and the assembling step.

12. The method of claim 9 further comprising the step of:

storing data from a PS-3877 form.

13. The method of claim 9 further comprising the step of:

imaging the corresponding addressee and/or sender data onto a PS-3811 form.

14. A system for automatically imaging special service forms and affixing each of the forms to corresponding mailpieces to effect delivery of the mailpiece by a special service, the system comprising:

means for accepting mailpieces having a machine readable code;

means for storing data related to the mailpieces;

a code reader constructed and arranged to read the machine-readable code on the mailpieces;

means for accepting mailpieces having a machine readable code;

means for storing data related to the mailpieces;

a code reader constructed and arranged to read the machine-readable code on the mailpieces;

means for imaging data onto special service forms wherein the data is obtained from the means for storing data; and means for assembling each of the special service forms to a corresponding one of the mailpieces to effect delivery of the mailpiece by the special service.

15. The system of claim 14 further comprising:

means for verifying the imaging data on the special service forms.

16. The system of claim 14 further comprising:

a bar code reader constructed and arranged to read the machine-readable code on the mailpieces.

17. The system of claim 14 further comprising:

a computer controller.

18. The system of claim 14 further comprising:

a label dispenser constructed and arranged to feed the special service forms to the means for imaging.

19. The system of claim 14 further comprising:

at least one further code reader constructed and arranged to examine the assembled special service forms and the mailpieces.

* * * * *